United States Patent
Cowelchuk et al.

(10) Patent No.: US 7,458,631 B2
(45) Date of Patent: *Dec. 2, 2008

(54) AUTOMOTIVE ARMREST WITH SOFT FEEL AND METHOD OF MAKING THE SAME

(75) Inventors: Glenn A Cowelchuk, Chesterfield Township, MI (US); Todd L DePue, Brighton, MI (US); David Dooley, Troy, MI (US); Michael J Hier, Milford, MI (US); Randy S Reed, Fair Haven, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,008

(22) Filed: Oct. 19, 2004

(65) Prior Publication Data

US 2006/0082190 A1 Apr. 20, 2006

(51) Int. Cl.
*B31F 1/00* (2006.01)
(52) U.S. Cl. .................... 296/153; 296/1.09
(58) Field of Classification Search ............ None
See application file for complete search history.

(56) References Cited

U.S. PATENT DOCUMENTS

| | | | |
|---|---|---|---|
| 3,400,979 A | 9/1968 | James et al. | 297/412 |
| 3,833,964 A | 9/1974 | Harcourt | |
| 4,124,308 A | 11/1978 | Sokolow | |
| 4,139,592 A | 2/1979 | Gallizia | |
| 4,155,972 A | 5/1979 | Hauser et al. | |
| 4,330,584 A | 5/1982 | Doerer | |

(Continued)

FOREIGN PATENT DOCUMENTS

DE 3711079 A1 10/1988

(Continued)

OTHER PUBLICATIONS

Lawrence E. Lambelet, Examiner, U.S. Patent and Trademark Office, Office Action for related U.S. Appl. No. 10/708,312, mailed Sep. 18, 2006.

(Continued)

*Primary Examiner*—Stephen Gordon
(74) *Attorney, Agent, or Firm*—Wood, Herron & Evans, L.L.P.

(57) ABSTRACT

The present invention provides for an improved armrest with a soft feel for use in a trim assembly, and to a continuous two-shot molding operation that may be continuously performed utilizing a single mold assembly. In an exemplary embodiment, a trim assembly includes an integrated armrest formed by injecting a first material into a first shot mold cavity in a first shot of a molding operation. An armrest cover is molded to at least a portion of the armrest by injecting into a mold chamber a second foamed material in a second shot of the molding operation to provide the armrest with a soft feel. The second foamed material includes a foamed material that produces a soft, outer skin and a light, cellular inner core such that when a force is applied to the cover, the skin will deform and compress the inner core, providing a soft-touch feel to the armrest.

8 Claims, 3 Drawing Sheets

U.S. PATENT DOCUMENTS

| | | | |
|---|---|---|---|
| 4,456,644 A | 6/1984 | Janz et al. | |
| 4,470,936 A | 9/1984 | Potter | |
| 4,543,366 A | 9/1985 | Smith | |
| 4,667,979 A | 5/1987 | Wolff | |
| 4,766,025 A | 8/1988 | Sanok et al. | |
| 4,781,956 A | 11/1988 | Zimmermann et al. | 428/43 |
| 4,783,114 A | 11/1988 | Welch | |
| 4,810,452 A | 3/1989 | Taillefert et al. | 264/247 |
| 4,882,842 A | 11/1989 | Basson et al. | 29/857 |
| 4,902,362 A | 2/1990 | Stewart et al. | |
| 4,929,017 A * | 5/1990 | Lilienthal et al. | 296/153 |
| 4,952,358 A | 8/1990 | Okina et al. | |
| 4,958,883 A | 9/1990 | Iwaki et al. | |
| 5,002,307 A | 3/1991 | Heidorn | |
| 5,040,335 A | 8/1991 | Grimes | 49/502 |
| 5,048,234 A | 9/1991 | Lau et al. | 49/502 |
| 5,071,605 A | 12/1991 | Kawaguchi et al. | 264/45.2 |
| 5,073,318 A | 12/1991 | Rohrlach et al. | 264/46.5 |
| 5,096,221 A | 3/1992 | Combs et al. | |
| 5,141,279 A | 8/1992 | Weller | |
| 5,178,807 A | 1/1993 | Thary | 264/46.4 |
| 5,181,759 A | 1/1993 | Doolittle | 296/153 |
| 5,224,299 A | 7/1993 | Abe | 49/502 |
| 5,297,842 A | 3/1994 | Hayashi | |
| 5,382,047 A | 1/1995 | Gajewski | |
| 5,387,390 A | 2/1995 | Kornylo | 264/46.8 |
| 5,395,135 A | 3/1995 | Lim et al. | |
| 5,399,393 A | 3/1995 | Zoller | |
| 5,407,225 A | 4/1995 | Cooper | |
| 5,433,910 A | 7/1995 | Mukai et al. | |
| 5,445,430 A | 8/1995 | Nichols | 296/153 |
| 5,456,490 A | 10/1995 | Carter et al. | |
| 5,468,433 A | 11/1995 | Perry et al. | 264/46.4 |
| 5,474,841 A | 12/1995 | Matsuki et al. | 428/304.4 |
| 5,478,516 A | 12/1995 | Malm et al. | |
| 5,484,561 A | 1/1996 | Weber et al. | |
| 5,502,942 A | 4/1996 | Gras et al. | |
| 5,527,084 A | 6/1996 | Scherf | |
| 5,536,351 A | 7/1996 | Rheinlander et al. | 156/212 |
| 5,562,797 A | 10/1996 | Phelps | |
| 5,571,581 A | 11/1996 | Koizumi et al. | |
| 5,571,597 A | 11/1996 | Gallagher et al. | 428/152 |
| 5,573,617 A | 11/1996 | Franck et al. | 156/196 |
| 5,582,789 A | 12/1996 | Stein et al. | |
| 5,590,901 A | 1/1997 | MacGregor | 280/728.3 |
| 5,591,078 A | 1/1997 | Filion et al. | |
| 5,626,382 A | 5/1997 | Johnson et al. | 296/146.7 |
| 5,626,704 A | 5/1997 | Bowers, Jr. et al. | |
| 5,651,998 A | 7/1997 | Bertschi et al. | |
| 5,663,210 A | 9/1997 | Sugimoto et al. | 521/81 |
| 5,679,296 A | 10/1997 | Kelman et al. | |
| 5,679,301 A | 10/1997 | Miklas et al. | |
| 5,692,711 A | 12/1997 | Tucker | 248/118 |
| 5,695,699 A | 12/1997 | Naritomi | |
| 5,695,870 A | 12/1997 | Kelch et al. | |
| 5,698,283 A | 12/1997 | Yamasaki et al. | |
| 5,702,810 A | 12/1997 | Koseki et al. | |
| 5,709,912 A | 1/1998 | Goto et al. | |
| 5,709,925 A | 1/1998 | Spengler et al. | 428/198 |
| 5,715,966 A | 2/1998 | Nagano et al. | 220/339 |
| 5,728,342 A | 3/1998 | Wirt et al. | |
| 5,728,409 A | 3/1998 | Schad et al. | |
| 5,738,810 A | 4/1998 | De Filippo | 264/46.7 |
| 5,744,077 A | 4/1998 | Grisch et al. | |
| 5,744,210 A | 4/1998 | Hoffmann et al. | |
| 5,779,262 A | 7/1998 | Totani et al. | |
| 5,783,293 A | 7/1998 | Lammi | |
| 5,786,047 A | 7/1998 | Tomblin | |
| 5,792,413 A | 8/1998 | Ang et al. | 264/515 |
| 5,799,385 A | 9/1998 | Vecchiarino et al. | 29/469 |
| 5,800,759 A | 9/1998 | Yamazaki et al. | |
| 5,803,415 A | 9/1998 | Konishi et al. | 248/18 |
| 5,810,388 A | 9/1998 | Berardi et al. | 280/728.3 |
| 5,811,053 A | 9/1998 | Ota et al. | |
| 5,816,609 A | 10/1998 | Gray et al. | 280/728.3 |
| 5,817,345 A | 10/1998 | Koch et al. | |
| 5,837,172 A | 11/1998 | Pritchard et al. | |
| 5,839,752 A | 11/1998 | Yamasaki et al. | |
| 5,853,772 A | 12/1998 | Kudert et al. | |
| 5,868,455 A | 2/1999 | Springer et al. | |
| 5,871,253 A | 2/1999 | Erber | |
| 5,884,434 A | 3/1999 | Dedrich et al. | 49/503 |
| 5,885,662 A | 3/1999 | Gardner, Jr. | |
| 5,904,370 A | 5/1999 | Steiner et al. | |
| 5,932,331 A | 8/1999 | Jones et al. | |
| 5,934,730 A | 8/1999 | Yagishita et al. | |
| 5,941,557 A | 8/1999 | Mullins, Jr. | |
| 5,951,094 A | 9/1999 | Konishi et al. | 296/153 |
| 5,952,630 A | 9/1999 | Filion et al. | |
| 5,967,594 A | 10/1999 | Ramanujam | 296/153 |
| 5,976,289 A | 11/1999 | Kawakubo et al. | 156/78 |
| 5,979,931 A | 11/1999 | Totani et al. | |
| 5,985,198 A | 11/1999 | Harris et al. | |
| 5,995,380 A | 11/1999 | Maue et al. | 361/826 |
| 6,003,716 A | 12/1999 | Allison et al. | 220/326 |
| 6,012,735 A | 1/2000 | Gray et al. | 280/728.2 |
| 6,013,210 A | 1/2000 | Gardner, Jr. | 264/40.1 |
| 6,017,617 A | 1/2000 | Gardner, Jr. | 428/309.9 |
| 6,019,923 A | 2/2000 | Pelzer | |
| 6,042,139 A | 3/2000 | Knox | |
| 6,070,905 A | 6/2000 | Renault | |
| 6,092,858 A | 7/2000 | Bolwell | |
| 6,103,168 A | 8/2000 | Kelly | |
| 6,103,390 A | 8/2000 | Kamiya et al. | |
| 6,116,672 A | 9/2000 | Cannon et al. | |
| 6,117,380 A | 9/2000 | Shirai et al. | |
| 6,123,385 A | 9/2000 | Bailey et al. | 296/146.7 |
| 6,129,378 A | 10/2000 | Goto et al. | |
| 6,129,870 A | 10/2000 | Hettinga | |
| 6,129,960 A | 10/2000 | Kudert et al. | |
| 6,136,415 A | 10/2000 | Spengler | |
| 6,149,853 A | 11/2000 | Luckett et al. | 264/266 |
| 6,158,766 A | 12/2000 | Kowalski | |
| 6,168,188 B1 | 1/2001 | Preisler et al. | 280/728.3 |
| 6,168,742 B1 | 1/2001 | Yamamoto | |
| 6,185,872 B1 | 2/2001 | Seeberger et al. | 49/502 |
| 6,186,582 B1 | 2/2001 | Beckmann | |
| 6,210,613 B1 | 4/2001 | Stein et al. | 264/45.4 |
| 6,210,614 B1 | 4/2001 | Gardner, Jr. | |
| 6,213,506 B1 | 4/2001 | Swann et al. | |
| 6,213,538 B1 | 4/2001 | Scheidmantel et al. | |
| 6,214,157 B1 | 4/2001 | Sjpengler | 156/304.6 |
| 6,217,098 B1 | 4/2001 | O'Brien et al. | 296/70 |
| 6,221,304 B1 | 4/2001 | Harris et al. | |
| 6,238,507 B1 | 5/2001 | Jones et al. | 156/224 |
| 6,248,200 B1 | 6/2001 | Dailey et al. | 156/245 |
| 6,251,326 B1 | 6/2001 | Siano et al. | 264/328.8 |
| 6,267,918 B1 | 7/2001 | Bauer | |
| 6,280,678 B1 | 8/2001 | Hara et al. | |
| 6,308,488 B1 | 10/2001 | Hoshino | |
| 6,319,438 B1 | 11/2001 | Smith et al. | 264/75 |
| 6,322,738 B1 | 11/2001 | Sicilia et al. | |
| 6,357,788 B2 | 3/2002 | Kreile | |
| 6,358,599 B1 | 3/2002 | Deibel et al. | |
| 6,872,673 B2 | 3/2002 | MacAulay | |
| 6,364,351 B1 | 4/2002 | Hier et al. | 280/732 |
| 6,368,093 B1 | 4/2002 | Vecchiarino et al. | 425/130 |
| 6,381,906 B1 | 5/2002 | Pacella et al. | 49/502 |
| 6,391,232 B1 | 5/2002 | Fritsch | |
| 6,402,189 B1 | 6/2002 | Gray et al. | |
| 6,409,947 B1 | 6/2002 | Wandyez | |
| 6,431,600 B1 | 8/2002 | Freisler et al. | |
| 6,433,728 B1 | 8/2002 | Krupp et al. | 341/176 |
| 6,440,514 B1 | 8/2002 | Ueno et al. | |

| | | | | | | |
|---|---|---|---|---|---|---|
| 6,447,047 B1 | 9/2002 | Marcovecchio et al. | | 2003/0176576 A1 | 9/2003 | Fujita et al. |
| 6,453,535 B1 | 9/2002 | Nicholas | | 2003/0184064 A1 | 10/2003 | Hier et al. .................... 280/732 |
| 6,474,724 B2 | 11/2002 | Lemmon et al. ............. 296/189 | | 2003/0184108 A1 | 10/2003 | Donovan et al. |
| 6,479,114 B2 | 11/2002 | Mizuno et al. | | 2003/0209888 A1 | 11/2003 | David, Jr. et al. ......... 280/728.3 |
| 6,485,072 B1 | 11/2002 | Werner et al. | | 2003/0209890 A1 | 11/2003 | Totani et al. |
| 6,495,722 B1 | 12/2002 | Zimmerman et al. | | 2003/0209892 A1 | 11/2003 | Hier et al. .................... 280/732 |
| 6,517,144 B2 | 2/2003 | Kobayashi | | 2004/0017023 A1 | 1/2004 | Schoemann et al. |
| 6,544,449 B1 | 4/2003 | Gardner ..................... 264/46.5 | | 2004/0029986 A1 | 2/2004 | Ghobary et al. |
| 6,554,350 B2 | 4/2003 | Takahara | | 2004/0032055 A1 | 2/2004 | Cavallaro et al. |
| 6,568,707 B2 | 5/2003 | Hier et al. .................... 280/732 | | 2004/0119267 A1 | 6/2004 | Cowelchuck et al. ..... 280/728.3 |
| 6,569,365 B1 | 5/2003 | Mizuno et al. | | 2004/0119268 A1 | 6/2004 | Davis, Jr. et al. ......... 280/728.3 |
| 6,572,300 B2 | 6/2003 | Altonen et al. | | 2004/0130051 A1 | 7/2004 | Cowelchuk et al. |
| 6,615,546 B2 | 9/2003 | Furuyama et al. | | 2004/0202824 A1 | 10/2004 | Hayashi et al. |
| 6,616,216 B2 | 9/2003 | Furuyama et al. | | 2004/0222619 A1 | 11/2004 | DePue et al. |
| 6,627,134 B2 | 9/2003 | Thomson | | 2005/0046075 A1 | 3/2005 | Youngs et al. |
| 6,644,727 B2 | 11/2003 | Audibert et al. | | 2005/0079336 A1 | 4/2005 | Dry et al. |
| 6,652,793 B2 | 11/2003 | Corrion et al. .............. 264/242 | | 2005/0183239 A1 | 8/2005 | Chen |
| 6,657,158 B1 | 12/2003 | Skelly et al. | | 2005/0183897 A1 | 8/2005 | DePue et al. |
| 6,660,781 B1 | 12/2003 | Ghobary et al. | | 2005/0186388 A1 | 8/2005 | Mekas et al. |
| 6,669,228 B2 | 12/2003 | Shah et al. | | 2005/0194806 A1 | 9/2005 | Cowelchuk et al. |
| 6,688,640 B1 | 2/2004 | Davis, Jr. et al. ......... 280/728.3 | | 2005/0242619 A1 | 11/2005 | Schoemann et al. |
| 6,706,365 B2 | 3/2004 | Akasaka et al. | | 2006/0001291 A1 | 1/2006 | Dooley et al. |
| 6,708,462 B2 | 3/2004 | Pokorzynski et al. | | 2006/0029789 A1 | 2/2006 | Donatti et al. |
| 6,740,390 B2 | 5/2004 | Randazzo ................... 428/122 | | 2006/0082173 A1 | 4/2006 | Cowelchuk et al. |
| 6,742,830 B2 | 6/2004 | Zimmerman et al. | | 2006/0082190 A1 | 4/2006 | Cowelchuk et al. |
| 6,746,067 B2 | 6/2004 | Schmidt et al. | | 2006/0216479 A1 | 9/2006 | Cowelchuk et al. |
| 6,749,794 B2 | 6/2004 | Spengler | | | | |
| 6,753,057 B1 | 6/2004 | Gardner, Jr. | | FOREIGN PATENT DOCUMENTS | | |
| 6,756,004 B2 | 6/2004 | Davis, Jr. et al. ............ 264/255 | | DE | 19534982 C2 | 6/1996 |
| 6,758,510 B1 | 7/2004 | Starling ..................... 296/39.1 | | DE | 4480340 C2 | 12/1996 |
| 6,761,388 B2 | 7/2004 | Lein et al. ................ 296/23.34 | | DE | 19733667 C2 | 2/1999 |
| 6,764,621 B2 | 7/2004 | Schwaighofer | | DE | 198 14 956 A1 | 10/1999 |
| 6,764,633 B2 | 7/2004 | Takahashi et al. ........... 264/259 | | DE | 19934249 | 2/2001 |
| 6,793,181 B1 | 9/2004 | Hallock | | DE | 19934249 A1 | 2/2001 |
| 6,821,465 B1 | 11/2004 | Stein et al. | | DE | 10104036 | 8/2001 |
| 6,827,799 B2 | 12/2004 | Zimmer et al. | | DE | 10120288 A1 | 12/2001 |
| 6,837,544 B2 | 1/2005 | Bornchen et al. | | DE | 10123207 | 7/2002 |
| 6,841,107 B2 | 1/2005 | Peters et al. | | DE | 10160173 A1 | 6/2003 |
| 6,857,688 B2 | 2/2005 | Morrison et al. | | DE | 102004023823 A1 | 12/2004 |
| 6,875,484 B1 | 4/2005 | Kogure et al. | | DE | 60106159 T2 | 9/2005 |
| 6,893,077 B1 | 5/2005 | DeJongh | | EP | 0408202 | 1/1991 |
| 6,899,363 B2 | 5/2005 | Dry | | EP | 0410553 | 1/1991 |
| 6,899,373 B2 | 5/2005 | Kim | | EP | 0749872 A2 | 12/1996 |
| 6,921,571 B2 | 7/2005 | Funakoshi | | EP | 0749872 | 3/2000 |
| 6,929,309 B1 | 8/2005 | Radu et al. | | EP | 10866863 | 3/2001 |
| 6,955,392 B2 | 10/2005 | Dry | | EP | 1182024 | 2/2002 |
| 6,981,735 B1 | 1/2006 | Stephens | | EP | 1580077 | 9/2005 |
| 6,983,967 B2 | 1/2006 | Scheidmantal et al. | | FR | 2771356 | 5/1999 |
| 6,991,841 B2 | 1/2006 | Cowelchuk et al. | | FR | 2796610 | 1/2001 |
| 7,005,092 B2 | 2/2006 | Dooley et al. | | GB | 2403683 | 1/2005 |
| 7,018,702 B2 | 3/2006 | Hacke | | GB | 2419106 A | 4/2006 |
| 7,045,206 B1 | 5/2006 | Granata et al. | | GB | 2419317 A | 4/2006 |
| 7,051,438 B2 | 5/2006 | O'Brien et al. | | GB | 2419318 A | 4/2006 |
| 7,055,850 B2 | 6/2006 | Freystedt | | GB | 2419319 A | 4/2006 |
| 7,108,312 B2 | 9/2006 | Cowelchuk et al. | | GB | 2419322 A | 4/2006 |
| 7,156,437 B2 | 1/2007 | Cowelchuk et al. | | JP | 62170303 A | 7/1987 |
| 2001/0030436 A1 | 10/2001 | Kifer et al. | | JP | 63082847 A | 4/1988 |
| 2001/0047899 A1 | 12/2001 | Ikeda ......................... 180/90 | | JP | 05237871 | 9/1993 |
| 2002/0041912 A1 | 4/2002 | Thomson | | JP | 08011145 | 1/1996 |
| 2002/0043861 A1 | 4/2002 | Meadows .............. 297/411.21 | | JP | 08026054 | 1/1996 |
| 2002/0066972 A1 | 6/2002 | Fritsch | | JP | 8183059 | 7/1996 |
| 2002/0079603 A1 | 6/2002 | Bernis et al. | | JP | 08183059 | 7/1996 |
| 2002/0125734 A1 | 9/2002 | Pokorzynski et al. | | JP | 2000/016216 | 7/1998 |
| 2002/0153741 A1 | 10/2002 | Speelman et al. ............. 296/70 | | JP | 10291431 | 11/1998 |
| 2003/0011174 A1 | 1/2003 | Merrifield et al. | | JP | 11070604 | 3/1999 |
| 2003/0017224 A1 | 1/2003 | Byma et al. | | JP | 11123999 | 5/1999 |
| 2003/0030188 A1 | 2/2003 | Spengler | | JP | 11291288 | 10/1999 |
| 2003/0041955 A1 | 3/2003 | Spengler | | JP | 2003/103675 | 4/2003 |
| 2003/0071039 A1 | 4/2003 | Spykerman et al. | | JP | 2003103676 | 4/2003 |
| 2003/0075833 A1 | 4/2003 | Thomson | | JP | 2003/266476 | 9/2003 |
| 2003/0121877 A1 | 7/2003 | Brozell et al. | | JP | 2003266464 A | 9/2003 |
| 2003/0155787 A1 | 8/2003 | Lein et al. | | JP | 2005/119404 | 5/2005 |
| 2003/0176575 A1 | 9/2003 | Sugimoto et al. | | | | |

| | | | |
|---|---|---|---|
| WO | WO 01/25055 | 4/2001 | |

OTHER PUBLICATIONS

Alicia A. Chevalier, Examiner, U.S. Patent and Trademark Office, Office Action for related U.S. Appl. No. 10/708,315, mailed Oct. 5, 2006.

Gregory A. Blankenship, Examiner, U.S. Patent and Trademark Office, Office Action to related U.S. Appl. No. 10/904,407, mailed Aug. 14, 2006.

European Patent Office, Combined Search and Examination Report for related UK application No. GB0611060.5, mailed Aug. 1, 2006.

Gregory A. Blankenship, Examiner, U.S. Patent & Trademark Office, Office Action of related U.S. Appl. No. 10/904,010, mailed Jul. 27, 2006.

German Patent Office, Office Action issued Jun. 2, 2006 for corresponding German application.

Gregory A. Blankenship, Examiner, U.S. Patent and Trademark Office, Office Action for related U.S. Appl. No. 10/904,015, mailed May 19, 2006.

Lawrence Emile Lambelet, Examiner, U.S. Patent and Trademark Office, Office Action for related U.S. Appl. No. 10/708,312, Mailed May 17, 2006.

Stephen T. Gordon, Examiner, United States Patent and Trademark Office, Office Action for related U.S. Appl. No. 10/708,315, mailed Apr. 18, 2006.

Blankenship, Gregory A. (Examiner), U.S. Patent and Trademark Office, Office Action mailed Mar. 14, 2006, related U.S. Appl. No. 10/905,007.

Patel, Kiran B. (Examiner), U.S. Patent and Trademark Office, Office Action mailed Mar. 27, 2006, related U.S. Appl. No. 10/709,382.

Patel, Kiran B. (Examiner), U.S. Patent and Trademark Office, Notice of Allowance mailed Mar. 24, 2006, related U.S. Appl. No. 10/904,409.

U.S. Patent and Trademark Office, *Office Action mailed Mar. 1, 2006*, related U.S. Appl. No. 10/904,010.

United Kingdom Patent Office, *Combined Search and Examination Report*, corresponding British Application No. GB0520991.1, Jan. 20, 2005.

United Kingdom Patent Office, *Combined Search and Examination Report*, corresponding British Application No. GB0522230.2, Jan. 31, 2006.

United Kingdom Patent Office, *Combined Search and Examination Report*, corresponding British Application No. GB0522255.9, Jan. 3, 2006.

UK Patent Office, *Combined Search and Examination Report*, corresponding U.K. Application No. GB0520995.2, Dec. 23, 2005.

UK Patent Office, *Combined Search and Examination Report*, corresponding U.K. Application No. GB0520998.6, Dec. 23, 2005.

UK Patent Office, *Combined Search and Examination Report*, corresponding U.K. Application No. 0521000.0, Dec. 14, 2005.

UK Patent Office, *Combined Search and Examination Report*, corresponding U.K. Application No. 0521007.5, Dec. 23, 2005.

UK Patent Office, *Combined Search and Examination Report*, corresponding U.K. Application No. 0521009.1, Dec. 16, 2005.

United Kingdom Patent Office, *Combined Search and Examination Report*, corresponding British Application No. GB0521011.7, Nov. 18, 2005.

United Kingdom Patent Office, *Combined Search and Examination Report*, corresponding British Application No. GB0521012.5, Nov. 21, 2005.

U.S. Patent and Trademark Office Examiner, *Office Action*, U.S. Appl. No. 10/708,315, Nov. 15, 2005.

Examiner, *Final Office Action dated Oct. 3, 2005*, U.S. Appl. No. 10/708,500.

Examiner, *Final Office Action dated Oct. 13, 2005*, U.S. Appl. No. 10/709,382.

Examiner, U.S. Patent and Trademark Office, Office Action dated Jun. 21, 2005, related U.S. Appl. No. 10/904,010.

Sopher, *Advancements in Soft Polyoefin Bead Foams for Automotive Interior Trim Components*, Brochure, 2004.

United States Patent and Trademark Office, Non-Final Office Action is related U.S. Appl. No. 10/904,408, mailed Oct. 31, 2006 (7 pages).

United States Patent and Trademark Office, Non-Final Office Action in related U.S. Appl. No. 10/904.033, mailed Dec. 8, 2006 (6 pages).

United States Patent and Trademark Office, Non-Final Office Action in related U.S. Appl. No. 10/904,015, mailed Dec. 6, 2006 (9 pages).

United States Patent and Trademark Office, Non-Final Office action received in related U.S. Appl. No. 11/160,088, mailed Jan. 23, 2007 (25 pages).

United States Patent and Trademark Office, Non-Final Office Action in related U.S. Appl. No. 10/711,692, mailed Jan. 29, 2007, (51pages).

German Patent and Trademark Office, Office Action in related U.S. Appl. No. 11/160,088, mailed Jan. 26, 2007 (5 pages).

United States Patent and Trademark Office, Non-Final Office Action in related U.S. Appl. No. 10/904,032, mailed Feb. 8, 2007, (9 pages).

United States Patent and Trademark Office, Final Office Action in related U.S. Appl. No. 10/904,011, mailed Mar. 8, 2007, (21 pages).

United States Patent and Trademark Office, Final Office Action in related U.S. Appl. No. 10/904,032, mailed Jun. 16, 2007 (8 pages).

United States Patent and Trademark Office, Notice of Allowance in related U.S. Appl. No. 11/160,088, mailed Jun. 20, 2007 (10 pages).

United States Patent and Trademark Office, Final Office Action in related U.S. Appl. No. 10/904,033, mailed May 16, 2007 (15 pages).

United States Patent and Trademark Office, Non-Final Office Action in related U.S. Appl. No. 10/904,015, mailed Apr. 17, 2007 (10 pages).

United States Patent and Trademark Office, Final Office Action in related U.S. Appl. No. 10/904,010, mailed May 3, 2007 (17 pages).

United States Patent and Trademark Office, Final Office Action in related U.S. Appl. No. 10/904,408, mailed Apr. 19, 2007.

United States Patent and Trademark Office, Final Office Action in related U.S. Appl. No. 10/708,312, mailed Mar. 23, 2007, (10 pages).

United States Patent and Trademark Office, Final Office Action in related U.S. Appl. No. 10/708,315, mailed Mar. 22, 2007, (16 pages).

UK Intellectual Property Office, Patents Act 1977: Examination Report Under Section 18(3), dated Dec. 14, 2007, 3 pages.

United States Patent and Trademark Office, Non-Final Office Action in related U.S. Appl. No. 10/904,032 mailed Sep. 27, 2007 (8 pages).

United States Patent and Trademark Office, Non-Final Office Action in related U.S. Appl. No. 10/904,408 mailed Oct. 16, 2007 (7 pages).

German Patent Office, Office Action issued in Application No. 10 2005 049 866.3-21, dated Jan. 28, 2008 (4 pages).

German Patent Office, Office Action issued in Application No. 10 2005 050 162.1-21, dated Feb. 1, 2008 (5 pages).

United States Patent and Trademark Office, Non-Final Office Action in related U.S. Appl. No. 10/904,011, mailed Feb. 29, 2008 (13 pages).

German Patent Office, Office Action issued in Application No. 10 2005 050 164.8-21, dated Feb. 6, 2008 (4 pages).

United States Patent and Trademark Office, Final Office Action in related U.S. Appl. No. 10/904,407, mailed Mar. 11, 2008 (19 pages).

United States Patent and Trademark Office, Final Office Action in related U.S. Appl. No. 10/904,032, mailed Mar. 25, 2008 (17 pages).

United States Patent and Trademark Office, Final Office Action in related U.S. Appl. No. 10/904,408, mailed Mar. 26, 2008 (16 pages).

United States Patent and Trademark Office, Final Office Action in related U.S. Appl. No. 10/904,010, mailed May 7, 2008 (10 pages).

United States Patent and Trademark Office, Office Action in related U.S. Appl. No. 10/904,407, mailed Jun. 2, 2008 (16 pages).

German Patent Office, Office Action Issued in Application No. 10 2005 053 477.5-21, dated May 7, 2008 (5 pages).

German Patent Office, Office Action Issued in Application No.10 2005 052 976.3-21, dated Apr. 28, 2008 (4 pages).

German Patent Office, Office Action Issued in Application No. 10 2005 053 479.1-21 dated May 9, 2008 (4 pages).

United States Patent and Trademark Office, Office Action in related U.S. Appl. No. 11/538,650, mailed Aug. 5, 2008 (107 pages).

United States Patent and Trademark Office, Office Action in related U.S. Appl. No. 10/904,011, mailed Aug. 7, 2008 (18 pages).

United States Patent and Trademark Office, Notice of Allowance in related U.S. Appl. No. 11/904,032, mailed Aug. 5, 2008 (8 pages).

* cited by examiner

AUTOMOTIVE ARMREST WITH SOFT FEEL AND METHOD OF MAKING THE SAME

CROSS REFERENCE

The present invention is related to U.S. Ser. No. 10/708,312, filed Feb. 24, 2004; U.S. Ser. No. 10/708,315, filed Feb. 24, 2004 (now abandoned); U.S. Ser. No. 10/708,500, filed Mar. 8, 2004, which is now U.S. Pat. No. 7,070,221; U.S. Ser. No. 10/709,382, filed Apr. 30, 2004; U.S. Ser. No. 10/710,305, filed Jul. 1, 2004, which is now U.S. Pat. No. 7,104,590; U.S. Ser. No. 10/904,007, filed Oct. 19, 2004, which is now U.S. Pat. No. 7,156,437; U.S. Ser. No. 10/904,010, filed Oct. 19, 2004: U.S. Ser. No. 10/904,011, filed Oct. 19, 2004; U.S. Ser. No. 10/904,015, filed Oct. 19, 2004 (now abandoned); U.S. Ser. No. 10/904,032, filed Oct. 20, 2004; U.S. Ser. No. 10/711,692, filed Sep. 30, 2004 (now abandoned); U.S. Ser. No. 10/904,033, filed Oct. 20, 2004; U.S. Ser. No. 10/904,408, filed Nov. 9, 2004; U.S. Ser. No. 10/904,407, filed Nov. 9, 2004; U.S. Ser. No. 10/904,433, filed Nov. 10, 2004, which is now U.S. Pat. No. 7,192,074; and U.S. Ser. No. 10/904,409, filed Nov. 9, 2004, which is now U.S. Pat. No. 7,108,312.

FIELD OF THE INVENTION

The present invention pertains generally to trim assemblies for automotive interiors and, more particularly, to automotive armrests with a soft feel for use in trim assemblies, and to a method of making the same.

BACKGROUND OF THE INVENTION

It is known to provide automotive interiors with various trim assemblies to enhance the aesthetic appearance of the automotive interior and to provide comfort, as well as convenience, to vehicle occupants. Examples of these interior trim assemblies include instrument panels, door panels, and consoles. To increase the aesthetic appearance of the trim assemblies and to improve the comfort to vehicle occupants, it is often desired to provide at least portions, such as the armrests, of the trim assemblies with areas that are cushy or soft to the touch.

One primary drawback with current armrests is in the manufacturing and assembly thereof. Armrests having a soft feel, typically, have been formed by insertion of a resilient soft padding material beneath a pliable surface layer of leather, vinyl, or fabric material. The preformed, soft, resilient pad also may be secured to a rigid plastic shell and a pliable skin layer stretched over the pad and secured to the shell to form the trim assembly with soft feel armrest. In another conventional method of forming trim assemblies with padded armrests, a foam material may be injected between a rigid substrate and a skin layer joined to the substrate.

In addition, skin layers having bumps or nibs formed on the B-side, or back surface, thereof have been applied over rigid substrates in an effort to improve the feel of non-padded armrests. The nibs raise the skin layer slightly away from the rigid substrate to create "soft" areas that deform when a force is applied to the trim assembly. As such, it is the nib design, not the skin layer per se, that provides these soft areas. Also, while these nibbed trim assemblies offer a compromise between padded trim assemblies, they are still costly due to the fact that the skin layer must be manufactured separately in order to create the bumps or nibs. Consequently, the above noted methods are generally costly due to the multiple components and manufacturing steps required to make these trim assemblies.

There is thus a need for an improved armrest with a soft feel for use in a trim assembly, and a method for making the same, that reduces the number of parts and the labor required for assembly thereof thereby reducing overall manufacturing costs.

SUMMARY OF THE INVENTION

The present invention provides for an improved armrest with a soft feel for use in a trim assembly, e.g. a door trim panel or console panel.

To this end, the trim assembly includes a substrate including an armrest, advantageously an integrated armrest. The armrest can be made from a first material that may include a thermoplastic polymer such as a thermoplastic olefin, e.g. polypropylene, or polycarbonate/acrylonitrile butadiene styrene. An armrest cover is integrally molded to at least a portion of the armrest and is composed of a second foamed material to provide an armrest having a soft, cushy feel for a user, such as a vehicle driver or occupant. The second foamed material may be a foamed thermoplastic polymer such as a foamed thermoplastic elastomer or foamed polypropylene. The foamed material produces a lightweight cover that includes an outer skin and a cellular inner core such that when a force is applied to the cover, the outer skin will deform and compress the inner core, providing a soft-touch feel to the armrest. The second foamed material is activated, or foamed, by a blowing agent, such as sodium bicarbonate, nitrogen, or any other commonly known blowing agent.

The automotive armrest with soft feel is formed in a continuous two-shot molding process. In this operation, a mold assembly is provided in which the armrest, advantageously a door trim panel having an integrated armrest, is formed by injecting the first material into a first shot mold cavity in a first shot of the molding operation. A core of the mold assembly is used, advantageously rotated, to move the armrest from the first shot mold cavity to a second shot mold cavity, and a mold chamber is formed about at least a portion of the armrest within the second shot mold cavity. The lightweight armrest cover then is integrally molded thereover by injecting into the mold chamber the second foamed material in a second shot of the molding operation, the cover being molded to the portion of the armrest to provide the armrest with a soft feel. In an exemplary embodiment, the mold assembly for forming the armrest with soft feel includes first and second shot mold cavities and a rotatable core having first and second male portions adapted to mate with each cavity for forming a plurality thereof in a continuous manner.

By virtue of the foregoing, there is thus provided an improved armrest with a soft feel for use in a trim assembly, and a method of making the same, that reduces the number of parts and the labor required for assembly thereof thereby reducing overall manufacturing costs.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
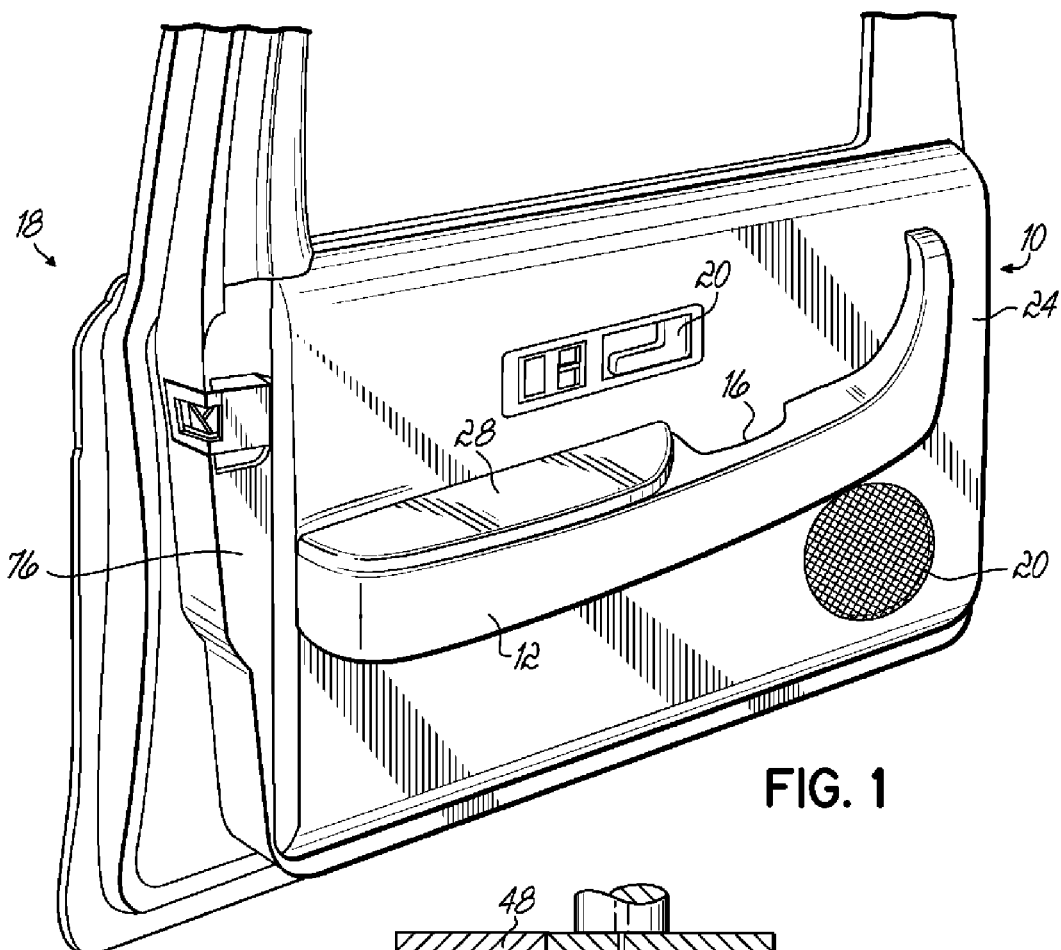
FIG. 1 is a perspective view of an automotive interior trim assembly having an armrest with soft feel according to the present invention.

In FIG. 1, an embodiment of an automotive interior trim assembly, i.e. a door trim panel 10, for an automobile (not shown) includes an integrated armrest 12 with soft feel. It should be understood that the armrest 12 with soft feel, although illustrated and described herein below as being integrated, may be molded by the methods disclosed below and provided as a separate part for attachment to the door trim panel 10. In addition, other various trim assemblies incorporating armrests, such as consoles, generally may be constructed in a similar fashion. Thus, while the following detailed description focuses on the door trim panel 10 having the integrated armrest 12 with soft feel, those having ordinary skill in the art will recognize that the armrest 12 with soft feel may equally be incorporated in other automotive trim assemblies.

With continuing reference to FIG. 1, the door trim panel 10 covers a portion of the interior of the automobile to provide a more aesthetically pleasing environment. Notably, the soft feel of the armrest 12 provides added comfort to the vehicle's occupants such as when the occupant chooses to rest an arm thereon. In addition, the armrest 12 further may include a handle portion 16 configured for grasping by a vehicle occupant to facilitate, for example, closing of a car door 18. A variety of openings, additionally, can be included in the trim panel 10 so as to accommodate the placement of hardware components 20 such as a speaker(s), door handle, window controls, etc.

Figure 4:
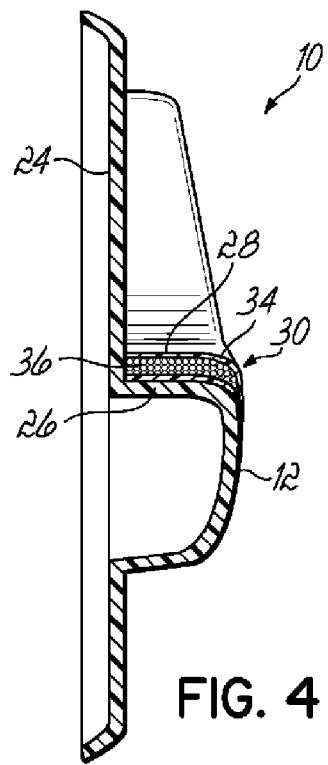
FIG. 4 is a cross-sectional view of the formed armrest with soft feel of FIG. 3A removed from the mold.

With continued reference to FIGS. 1 and 4, the door panel 10 includes a substrate 24 provided with the integrated armrest 12 that is made from a first material 26. The first material 26 may include a thermoplastic polymer such as a thermoplastic olefin, e.g. polypropylene, or polycarbonate/acrylonitrile butadiene styrene. The armrest 12 includes an armrest cover 28 that is bonded, i.e. integrally molded, to at least a portion thereof to provide the soft, cushy feel for a vehicle driver or occupant. It should be understood that the cover 28 may be provided over the entire armrest 12, as well as a portion of the armrest 12 that is more or less than shown, to provide the armrest 12 with a soft feel. In addition, as indicated above, the armrest 12 with molded cover 28 may be provided as a separate part from the door panel 10 for attachment thereto.

Notably, the cover 28 is composed of a second foamed material 30 that may include a foamed thermoplastic polymer such as a foamed thermoplastic elastomer or foamed polypropylene. The foamed material 30 produces an outer skin 34 and a light, cellular inner core 36 such that when a force is applied to the cover 28, the skin 34 will deform and compress the inner core 36, providing a soft-touch feel to the armrest 12. The second foamed material 30 may be activated, or foamed, by a blowing agent, such as sodium bicarbonate and the like, any gas such as nitrogen, or any other commonly known blowing agent. More specifically, the blowing agent is combined, or mixed, with a thermoplastic polymer, such as a thermoplastic elastomer or polypropylene, advantageously a thermoplastic elastomer available from Kraiburg TPE, Corp. of Duluth, Ga., to produce the second foamed material 30. The blowing agent advantageously is present in an amount from 0.1% to 5% by weight of the mixture, more advantageously from 0.5% to 3% by weight. The feel of the armrest 12 may also be selectively tuned to a desired softness by varying the thickness of the cover 28.

Figure 2A:
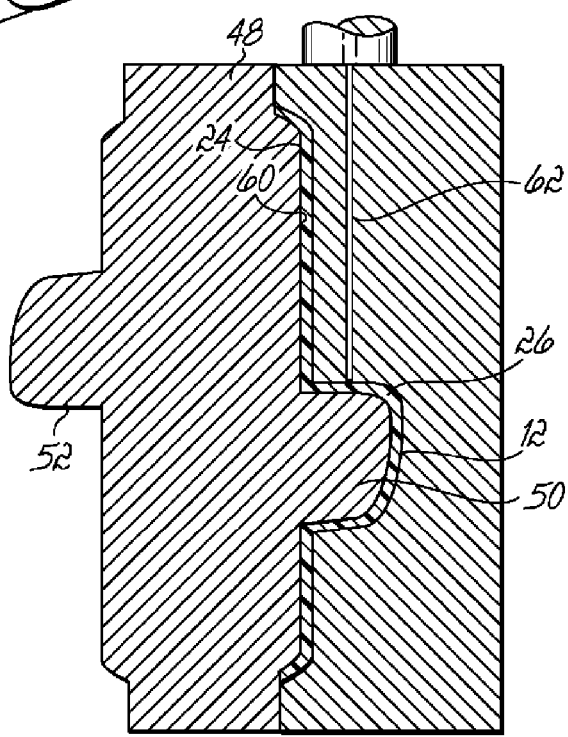
FIG. 2A is a cross-sectional view of the mold of FIG. 2 taken along the line 2A-2A illustrating the first shot of the molding operation.
Figure 2:
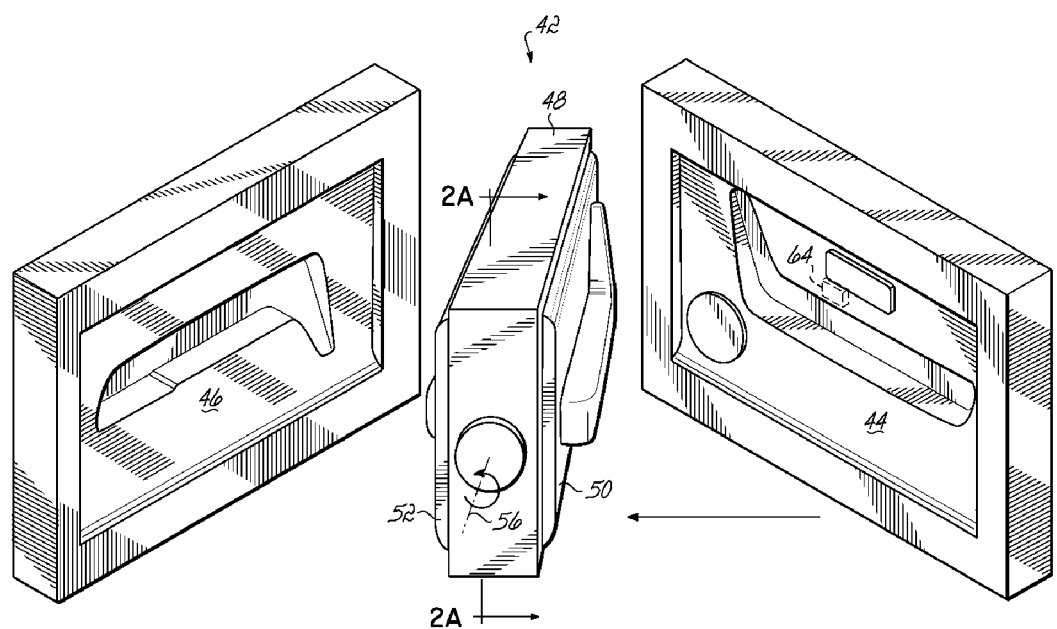
FIG. 2 is a perspective view of a mold assembly used to form the armrest with soft feel of the present invention.
Figure 3:
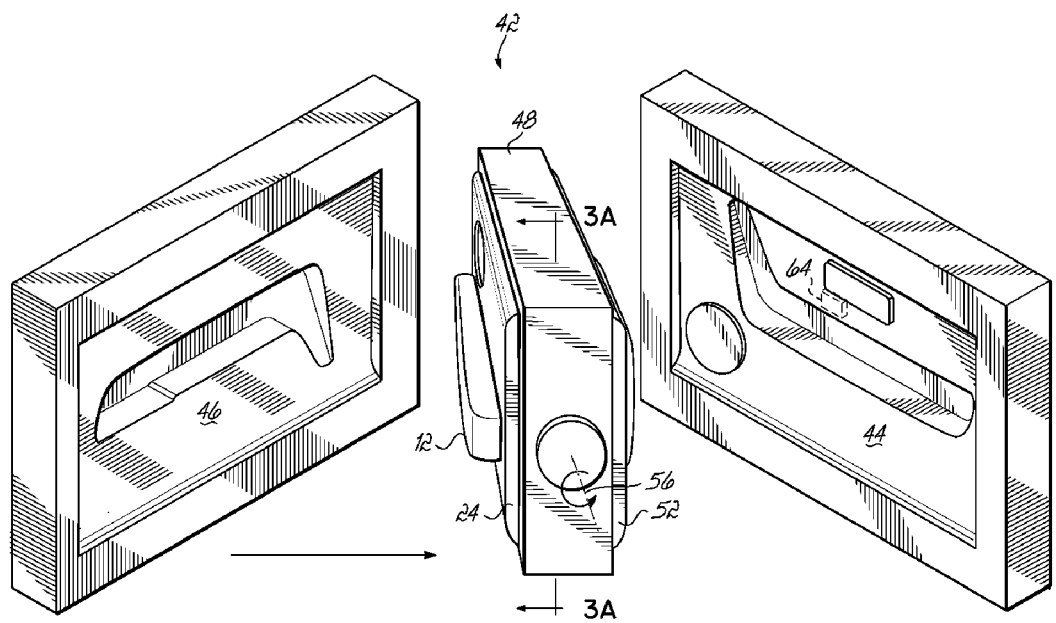
FIG. 3 is a perspective view of the mold assembly of FIG. 2 depicting the movement from the first shot mold cavity to the second shot mold cavity of the formed armrest of FIG. 2A.
Figure 3A:
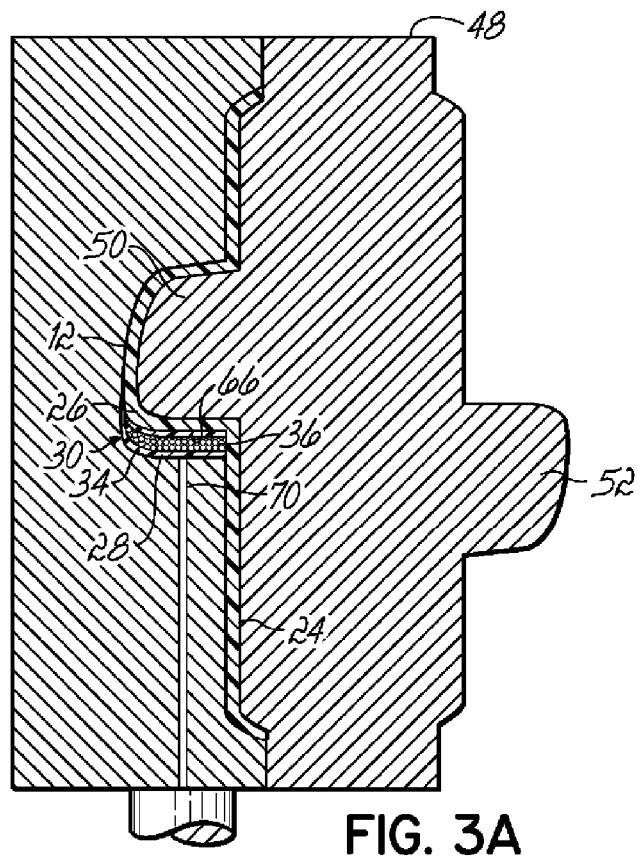
FIG. 3A is a cross-sectional view of the mold of FIG. 3 taken along the line 3A-3A illustrating the second shot of the molding operation.

With reference to FIGS. 2-3A, a method of making the automotive armrest 12 with soft-feel of the present invention will now be described. A single mold assembly 42 is shown in FIG. 2 including spaced apart first and second shot mold cavities 44 and 46 and a central core 48 having first and second male portions 50 and 52 adapted to mate with each cavity 44, 46. The core is 48 situated between the mold cavities 44, 46 and is adapted to rotate about a central axis, i.e. a horizontal axis 56, so that the first and second male portions 50, 52 can mate, in turn, with the mold cavities 44, 46 to mold, in sequence, first the armrest 12, advantageously the substrate 24, such as the door trim panel 10, with integrated armrest 12, then the armrest cover 28 in a continuous manner. It should be understood by the artisan that variations of the mold assembly 42 may be provided and still fall within the scope of this invention. For example, any number of core male portions 50, 52 (i.e. more or less than shown) may be provided, in conjunction with the necessary number of corresponding first and second shot mold cavities 44, 46, for molding the armrest 12 with soft feel.

While the first and second shots of the molding operation are further described below with respect to the first male portion 50 by utilizing the cross-sectional views of FIGS. 2 and 3, it is understood that the first and second shot molding process occurs in the same fashion with respect to the second male portion 52. Accordingly, as best shown in FIGS. 2 and 2A, the first male portion 50 of the core 48 mates with the first shot mold cavity 44 and, more specifically, the first shot mold cavity 44 is adapted to move toward the first male portion 50, as is commonly known in the art, to form a first shot chamber 60.

In a first shot of the molding operation, the first material 26, which may be a thermoplastic polymer such as a thermoplastic olefin, e.g. polypropylene, or polycarbonate/acrylonitrile butadiene styrene, is injected through a channel 62 into the chamber 60 to form the substrate 24 having the integrated armrest 12. Specifically, the molded substrate 24 is molded over the first male portion 50 such that the first male portion 50 retains the substrate 24. It should be understood, as indicated above, that the armrest 12 may be molded by the methods disclosed herein as a separate part for later attachment to the door panel 10, or any other desired trim assembly, e.g. a console panel. A movable slide 64, as known in the art, is provided within the first shot mold cavity 44 to produce the handle 16, or pull-cup, portion for grasping by a vehicle occupant to facilitate the closing of the vehicle door 18. In addition, a variety of openings may be formed therein, by means known in the art, so as to accommodate the placement of hardware components 20 such as a speaker(s), door handle, window controls, etc.

With further reference to FIGS. 3 and 3A, the first shot mold cavity 44 is retracted, or moved away from, the first male portion 50, and the core 48 having the first male portion 50 provided with the substrate 24 then is rotated about the horizontal axis 56 to move the substrate 24 from the first shot mold cavity 44 to the second shot mold cavity 46. It should be understood that the core 48 also may rotate about a vertical axis or be adapted to move, or slide, sideways to a second shot mold cavity. Next, the first male portion 50 of the core 48 mates with the second shot mold cavity 46 and, more specifically, the second shot mold cavity 46 is adapted to move toward the first male portion 50, as is commonly known in the art, to form a second shot chamber 66 about at least a portion of the integrated armrest 12.

In a second shot of the molding operation, the second foamed material 30, which may be a foamed thermoplastic polymer such as a foamed thermoplastic elastomer or foamed polypropylene, is injected through a channel 70 into the second shot chamber 66 to form the armrest cover 28. Notably, the cover 28 is bonded, or integrally molded, to at least the portion of the armrest 12 to provide the armrest 12 with a soft feel. As indicated above, the second foamed material 30 is activated, or foamed, by a blowing agent that can include sodium bicarbonate and the like, any gas such as nitrogen, or any other known blowing agent. More specifically, the blowing agent is combined, or pre-mixed, with a thermoplastic polymer, such as a thermoplastic elastomer or polypropylene, to form the second foamed material 30.

The second foamed material 30 produces the cover 28, which advantageously includes an outer skin 34 and a light, cellular inner core 36 such that when a force is applied to the cover 28, the skin 34 will deform and compress the inner core 36, providing the soft-touch feel to the armrest 12. In addition, the feel of the armrest 12 may be adjusted to any desired softness by varying the thickness of the cover 28, such as by altering the depth of the second shot chamber 66.

After the second foamed material 30 has been allowed time sufficient to cure, the second shot mold cavity 46 is retracted, or moved away from, the first male portion 50, and the automotive interior trim assembly, i.e. the door trim panel 10, having the integrated armrest 12 with soft feel is ejected from the first male portion 50, such as by ejector pins (not shown), so that the process may begin anew. Although not illustrated, it is understood that the second male portion 52 also is adapted to mate with the first shot cavity 44, during the mating of the first male portion 50 with the second shot mold cavity 46, to form a second substrate (not shown) that may be identical to the first substrate 24 by injecting the first material 26 into the first shot mold cavity 44 in the first shot of the molding operation. After injection, the core 48 with the second male portion 52 similarly rotates the second substrate to the second shot mold cavity 46 for the second shot of the molding operation while the first male portion 50 returns to the first shot mold cavity 44 to repeat the first shot of the molding operation. In this fashion, a plurality of automotive interior trim assemblies having integrated armrests with soft feel may be formed in a continuous and efficient manner.

With further reference to FIGS. 1 and 4, the molded trim panel assembly 10 includes the substrate 24 with integrated armrest 12 and the cover 28 integrally molded thereto thereby forming the armrest 12 with soft feel. The trim assembly 10 now may be coupled, by means known in the art, to a doorframe 76 structure of a motor vehicle. Accordingly, the molding operation of the present invention may be continuously performed utilizing a single mold assembly 42 to provide an improved trim assembly 10 having an armrest 12 with a soft feel.

Although, the method of making utilizes a single mold assembly for a continuous, integrated process, it still should be understood that the molding process may be performed in more than one mold assembly such that the trim part may be moved from the first shot mold cavity after the first shot to a second shot mold cavity provided in a second, separate mold assembly for the second shot of the molding operation. Movement can be manually or by other means commonly known in the art, e.g. robotically.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly with armrest, comprising:
    a substrate including an armrest made from a first material, wherein the substrate and armrest are integrally molded from the first material; and
    an outer armrest cover integrally molded to at least a portion of the armrest and made from a second material, the second material having an outer skin and a foamed inner core having a cellular construction, the outer skin and the foamed inner core being integrally formed together from the second material such that the outer skin will deform and compress the foamed inner core when a compressive force is applied to the outer skin thereby providing the armrest with a soft feel.

2. The automotive interior trim assembly of claim 1, wherein the substrate defines a door trim panel having the integrally molded armrest.

3. The automotive interior trim assembly of claim 1, wherein the first material includes a thermoplastic polymer and the second material includes a foamed thermoplastic polymer.

4. The automotive interior trim assembly of claim 3, wherein the foamed thermoplastic polymer includes one of a foamed thermoplastic elastomer or a foamed polypropylene.

5. An automotive interior trim assembly with a soft feel created by a blowing agent, comprising:
    a substrate including an armrest made from a first material, wherein the substrate and armrest are integrally molded from the first material; and
    an outer armrest cover integrally molded to at least a portion of the armrest and made from a second material, the second material of the outer armrest cover activated by the blowing agent to define an outer skin and a foamed inner core, the foamed inner core having a cellular construction such that the outer skin will deform and compress the foamed inner core when a force is applied to thereby provide the armrest with a soft feel.

6. The automotive interior trim assembly of claim 5, wherein the substrate defines a door trim panel having the integrally molded armrest.

7. The automotive interior trim assembly of claim 5, wherein the first material includes a thermoplastic polymer and the second material includes a foamed thermoplastic polymer.

8. The automotive interior trim assembly of claim 7, wherein the foamed thermoplastic polymer includes one of a foamed thermoplastic elastomer or a foamed polypropylene.

* * * * *